US012230860B2

(12) United States Patent
Wang et al.

(10) Patent No.: US 12,230,860 B2
(45) Date of Patent: Feb. 18, 2025

(54) ANTENNA AND TEMPERATURE CONTROL SYSTEM THEREOF

(71) Applicant: BOE TECHNOLOGY GROUP CO., LTD., Beijing (CN)

(72) Inventors: Xiyuan Wang, Beijing (CN); Feng Qu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 425 days.

(21) Appl. No.: 17/761,912

(22) PCT Filed: Mar. 15, 2021

(86) PCT No.: PCT/CN2021/080671
§ 371 (c)(1),
(2) Date: Mar. 18, 2022

(87) PCT Pub. No.: WO2022/193042
PCT Pub. Date: Sep. 22, 2022

(65) Prior Publication Data
US 2023/0163440 A1 May 25, 2023

(51) Int. Cl.
*H01Q 1/38* (2006.01)
*H01Q 1/02* (2006.01)
*H01Q 3/36* (2006.01)

(52) U.S. Cl.
CPC ................. *H01Q 1/02* (2013.01); *H01Q 3/36* (2013.01)

(58) Field of Classification Search
CPC .. H01Q 1/38; H01Q 3/36; H01Q 1/00; H01Q 1/002; H01Q 21/08; H01Q 9/04; H01Q 9/0414
See application file for complete search history.

(56) References Cited

U.S. PATENT DOCUMENTS 5,376,942 A * 12/1994 Shiga .................. H01Q 21/065 343/700 MS
6,396,440 B1 * 5/2002 Chen ........................ H01Q 3/26 343/768

(Continued)

FOREIGN PATENT DOCUMENTS

CN 103326115 A 9/2013
CN 103457015 A 12/2013

(Continued)

OTHER PUBLICATIONS

Lanhai, "Active phased Array antenna FOR millimeter wave communications," China Academic J. Elect. Pub. House, S.W. China Institute of Electronic Tech., 2018. p. 32, left col. paragraph 3—p. 34, right col. paragraph 2.

(Continued)

*Primary Examiner* — Tho G Phan
(74) *Attorney, Agent, or Firm* — HOUTTEMAN LAW LLC

(57) ABSTRACT

The present disclosure provides an antenna and a temperature control system of the antenna. The antenna includes a feed unit layer, a phase shifter layer, an amplifying circuit layer disposed between the feed unit layer and the phase shifter layer, and a temperature control unit layer disposed on a side of the amplifying circuit layer. The amplifying circuit is configured to amplify a microwave signal fed from the feed unit layer and transmit the microwave signal to the phase shifter layer; the phase shifter layer is configured to shift a phase of the microwave signal by a preset phase shift amount; and the temperature control unit layer is configured to adjust a temperature of the amplifying circuit layer to adjust an operating temperature of the antenna.

17 Claims, 5 Drawing Sheets

(56) References Cited

U.S. PATENT DOCUMENTS

| | | | | |
|---|---|---|---|---|
| 7,889,135 | B2 * | 2/2011 | Blaser | H01Q 21/0037 343/893 |
| 11,276,929 | B2 * | 3/2022 | Cao | H01Q 21/065 |
| 11,462,837 | B2 * | 10/2022 | Kuwabara | H01Q 21/065 |
| 11,929,535 | B2 * | 3/2024 | Ting | H01P 1/185 |
| 11,942,693 | B2 * | 3/2024 | Wang | H01Q 9/0407 |
| 2005/0146479 | A1 | 7/2005 | Stenger et al. | |
| 2014/0139400 | A1 | 5/2014 | Voss et al. | |

FOREIGN PATENT DOCUMENTS

| | | | |
|---|---|---|---|
| CN | 103872459 | A | 6/2014 |
| CN | 104037497 | A | 9/2014 |
| CN | 105958214 | A | 9/2016 |
| CN | 108563050 | A | 9/2018 |
| CN | 108963402 | A | 12/2018 |
| CN | 109462009 | A | 3/2019 |
| CN | 110824734 | A | 2/2020 |
| CN | 111063999 | A | 4/2020 |
| CN | 111293425 | A | 6/2020 |
| CN | 111541002 | A | 8/2020 |
| CN | 111668603 | A | 9/2020 |
| CN | 112382862 | A | 2/2021 |
| EP | 1150380 | A1 | 10/2001 |
| WO | WO 03107480 | A2 | 12/2003 |
| WO | WO 2020181557 | A1 | 9/2020 |

OTHER PUBLICATIONS

Li et al., "Research on Modularized Millimeter Wave Phased Array Antenna," China Academic J. Elect. Pub. House, 2020. p. 100 (left col. paragraph 1)—p. 101 (left col. paragraph 2).

Zhou et al., "Joint Design and Experimental Tests of Highly Integrated Phased-Array Antenna With Microchannel Heat Sinks," IEEE Antennas Wireless Propag. Lettrs., Nov. 2019, vol. 18, No. 11.

Lupien, "Phased Array Ultrasonic Non-Destructive Evaluation of ITER Plasma Facing Components," Acoustic Ideas, IEEE, 2007, Wakefield, MA.

China Patent Office, CN202180000496.0 First Office Action issued on Apr. 30, 2024.

* cited by examiner

ANTENNA AND TEMPERATURE CONTROL SYSTEM THEREOF

CROSS REFERENCE TO RELATED APPLICATIONS

This is a National Phase Application filed under 35 U.S.C. 371 as a national stage of PCT/CN2021/080671 filed on Mar. 15, 2021, the content of which is incorporated herein by reference in its entirety.

TECHNICAL FIELD

The present disclosure belongs to the field of communication, and specifically relates to an antenna and a temperature control system of the antenna.

BACKGROUND

In some antennas, a dielectric constant of a dielectric layer of a phase shifter in each of the antennas may change greatly with changes in the temperature, that is, an increase in the temperature may cause reduction of a phase shift angle range and increase of insertion loss of the phase shifter, which may cause performance deterioration of the antenna including the phase shifter, such as a lifted side lobe, a lowered main lobe, disturbed beam pointing, etc., and may pose great challenges to the simulation design and actual use of the antenna.

SUMMARY

Some embodiments of the present disclosure provide an antenna that at least adjusts a temperature of an amplifying circuit layer, and thus an operating temperature of the antenna, by a temperature control unit layer so that the operating temperature of the antenna is stabilized within a certain range, and thus temperature drifts of the antenna are suppressed and performance degradation of the antenna is prevented.

In a first aspect, an embodiment of the present disclosure provides an antenna, including: a feed unit layer, a phase shifter layer, an amplifying circuit layer disposed between the feed unit layer and the phase shifter layer, and a temperature control unit layer disposed on a side of the amplifying circuit layer; wherein

- the amplifying circuit layer is configured to amplify a microwave signal fed from the feed unit layer and transmit the microwave signal to the phase shifter layer;
- the phase shifter layer is configured to shift a phase of the microwave signal by a preset phase shift amount; and
- the temperature control unit layer is configured to adjust a temperature of the amplifying circuit layer to adjust an operating temperature of the antenna.

In the antenna provided in the embodiment of the present disclosure, a temperature controller is provided on a side of the amplifying circuit layer, and the temperature controller can adjust the temperature of the amplifying circuit layer so that the operating temperature of the antenna is stabilized within a certain range, and thus temperature drifts of the antenna are suppressed and performance degradation of the antenna is prevented.

In some examples, the temperature control unit layer is in direct contact with the amplifying circuit layer.

In some examples, the feed unit layer includes a first substrate, a plurality of microwave receiving units disposed on the first substrate, and a transmission line power splitting structure disposed on the first substrate;

- the transmission line power splitting structure has a plurality of first ports and a plurality of second ports, wherein each of the first ports is correspondingly connected to one of the microwave receiving units, and more than one of the first ports correspond to one of the second ports;
- the amplifying circuit layer includes a plurality of amplifying circuits, and each of the amplifying circuits is correspondingly connected to one of the second ports; and
- the temperature control unit layer is disposed between the amplifying circuit layer and the first substrate; wherein a plurality of flow channels are provided in the temperature control unit layer to accommodate a flow of a working medium.

In some examples, the antenna further includes: a plurality of microwave connectors, each of the microwave connectors has a first end connected to one of the second ports and a second end connected to one of the amplifying circuits;

- a plurality of holes are provided in the temperature control unit layer along a thickness direction of the temperature control unit layer, via which the microwave connectors respectively penetrate through the temperature control unit layer; and
- orthogonal projections of the plurality of flow channels on the amplifying circuit layer do not overlap with orthogonal projections of the plurality of holes on the amplifying circuit layer.

In some examples, the amplifying circuit layer includes a plurality of amplifying circuits; the phase shifter layer includes a plurality of phase shifters, and each of the phase shifters is correspondingly connected to one of the amplifying circuits;

- the temperature control unit layer is disposed on a side of the amplifying circuit layer proximal to the phase shifter layer, and has a plurality of accommodation cavities that wrap the phase shifters therein, respectively; and
- the temperature control unit layer is provided with a plurality of flow channels configured to accommodate a flow of a working medium;
- wherein orthogonal projections of the plurality of flow channels on the amplifying circuit layer do not overlap with orthogonal projections of the plurality of accommodation cavities on the amplifying circuit layer.

In some examples, each phase shifter includes a second substrate and a third substrate disposed opposite to each other, and a first dielectric layer disposed between the second substrate and the third substrate; and the first dielectric layers of the plurality of phase shifters have a one-piece structure.

In some examples, the phase shifter layer includes a plurality of phase shifters; each phase shifter includes a second substrate and a third substrate disposed opposite to each other, and a first dielectric layer disposed between the second substrate and the third substrate; and

- the second substrate includes: a first base; a first temperature regulation structure disposed on a side of the first base proximal to the first dielectric layer, and configured to adjust an operating temperature of the phase shifter; and a first transmission line disposed on a side of the first temperature regulation structure proximal to the first dielectric layer; and the third substrate includes: a second base; a second temperature regulation structure disposed on a side of the second base proximal to the first dielectric layer, and configured to adjust an operating temperature of the phase shifter; and a first reference electrode having a first opening and disposed on a side of the second temperature regulation structure proximal to the first dielectric layer; an orthogonal projection of the first reference electrode on the first base at least partially overlaps with an orthogonal projection of the first transmission line on the first base, and an orthogonal projection of the first opening on the first base at least partially overlaps with an orthogonal projection of a first end of the first transmission line on the first base, and wherein an orthogonal projection of the first temperature regulation structure on the first base and an orthogonal projection of the second temperature regulation structure on the first base do not overlap with the orthogonal projection of the first transmission line on the first base.

In some examples, the antenna further includes: a plurality of temperature detection units disposed on a side of the third or second substrate of each of at least some of the plurality of phase shifters and configured to detect the operating temperature of the phase shifter.

In some examples, the amplifying circuit layer includes a plurality of amplifying circuits, and each of the phase shifters is correspondingly connected to one of the amplifying circuits; each of the phase shifters further includes: a first waveguide structure connected between the phase shifter and the amplifying circuit; the first waveguide structure is configured to transmit a microwave signal by coupling to the first end of the first transmission line through the first opening; and wherein an orthogonal projection of the first waveguide structure on the first base does not overlap with the orthogonal projections of the first temperature regulation structure and the second temperature regulation structure on the first base.

In some examples, a minimum distance between the first temperature regulation structure and at least one of the first transmission line or the first waveguide structure is greater than or equal to 0.5 mm, and/or, a minimum distance between the second temperature regulation structure and at least one of the first transmission line or the first waveguide structure is greater than or equal to 0.5 mm.

In some examples, the first and/or second temperature regulation structure are resistance wires.

In some examples, the first substrate includes a first sub-substrate and a second sub-substrate, and the second sub-substrate is disposed on a side of the first sub-substrate proximal to the amplifying circuit layer;

the microwave receiving units include first sub-microwave receiving units and second sub-microwave receiving units, the first sub-microwave receiving units are arranged in an array on a side of the first sub-substrate distal to the second sub-substrate, and the second sub-microwave receiving units are arranged in an array on a side of the second sub-substrate proximal to the first sub-substrate; and the transmission line power splitting structure is disposed on a side of the second sub-substrate proximal to the first sub-substrate, and each of the first ports is correspondingly connected to one of the second sub-microwave receiving units; and wherein the first sub-microwave receiving units are in a one-to-one correspondence with the second sub-microwave receiving units, and an orthogonal projection of each first sub-microwave receiving unit on the second sub-substrate at least partially overlaps with an orthogonal projection of a corresponding second sub-microwave receiving unit on the second sub-substrate.

In some examples, the second sub-substrate has a plurality of first vias penetrating through the second sub-substrate in a thickness direction of the second sub-substrate, and each of the second ports corresponds to one of the first vias; and the antenna further includes: a plurality of microwave connectors; wherein each of the microwave connectors has a first end penetrating through one of the first vias to be connected to one of the second ports, and a second end connected to one of the amplifying circuits.

In some examples, the antenna further includes: a waveguide power splitting structure disposed on a side of the phase shifter layer distal to the amplifying circuit layer; wherein the waveguide power splitting structure has n levels of sub-waveguide structures, and in a direction from the phase shifter layer to the waveguide power splitting structure, the number of the sub-waveguide structures in each level is gradually reduced from the first level to the $n^{th}$ level; where $n \geq 2$;

a first end of each first level sub-waveguide structure is connected to one of the phase shifters, and second ends of at least two first level sub-waveguide structures are connected to a first end of one second level sub-waveguide structure;

a first end of each $m^{th}$ level sub-waveguide structure is connected second ends of at least two $(m-1)^{th}$ level sub-waveguide structures, and second ends of at least two $m^{th}$ level sub-waveguide structures are connected to a first end of one $(m+1)^{th}$ level sub-waveguide structure, where $1<m<n$; and a first end of each $n^{th}$ level sub-waveguide structure is connected second ends of at least two $(n-1)^{th}$ level sub-waveguide structures, and a second end of each $n^{th}$ level sub-waveguide structure serves as a combiner end of the waveguide power splitting structure.

In a second aspect, the present application further provides a temperature control system of an antenna, the antenna being any one of the antennas as described above.

In some examples, the temperature control system further includes: a circulation device connected to the flow channels; wherein the circulation device includes a working medium driving unit and a working medium temperature controller, the working medium driving unit is configured to drive the working medium to flow, and the working medium temperature controller is configured to control a temperature of the working medium.

DETAIL DESCRIPTION OF EMBODIMENTS

Figure 1:
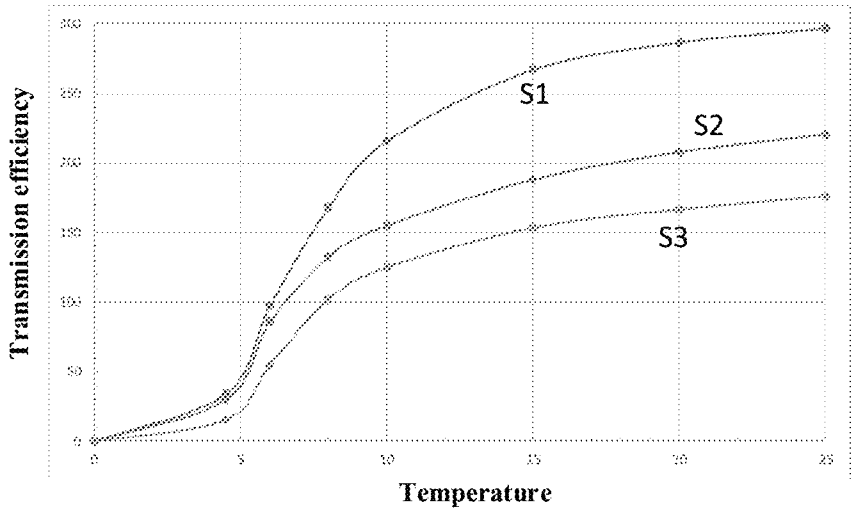
FIG. 1 is a schematic diagram showing temperature drift characteristics of an antenna.
Figure 2:
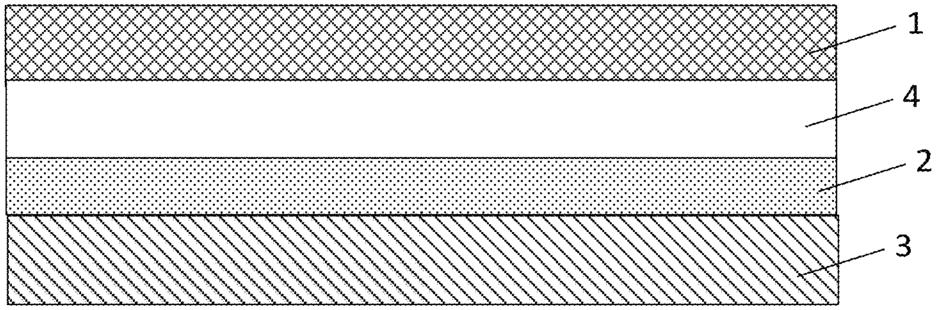
FIG. 2 is a schematic block diagram of an embodiment of an antenna according to an embodiment of the present disclosure.
Figure 3:
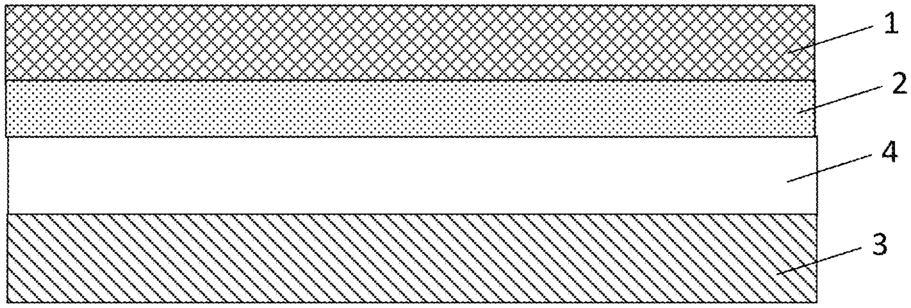
FIG. 3 is a schematic block diagram of another embodiment of an antenna according to an embodiment of the present disclosure.

To make the objects, technical solutions and advantages of the present disclosure more clear, the present disclosure will be described in further detail with reference to the accompanying drawings, and it is apparent that the described embodiments are only some, but not all, embodiments of the present disclosure. Based on the embodiments of the present disclosure, all other embodiments obtained by those ordinary skilled in the art without any creative effort fall into the protection scope of the present disclosure.

The shapes and sizes of the components in the drawings are not necessarily drawn to scale, but are merely intended to facilitate understanding of the contents of the embodiments of the present disclosure.

Unless otherwise defined, technical or scientific terms used in the present disclosure are intended to have general meanings as understood by those of ordinary skill in the art. The words "first", "second" and similar terms used in the present disclosure do not denote any order, quantity, or importance, but are used merely for distinguishing different components from each other. Also, the use of the terms "a", "an", or "the" and similar referents do not denote a limitation of quantity, but rather denote the presence of at least one element. The word "comprising" or "including" or the like means that the element or item preceding the word contains elements or items that appear after the word or equivalents thereof, but does not exclude other elements or items. The term "connected" or "coupled" or the like is not restricted to physical or mechanical connections, but may include electrical connections, whether direct or indirect connections. The words "upper", "lower", "left", "right", or the like is merely used to indicate a relative positional relationship, and when an absolute position of the described object is changed, the relative positional relationship may also be changed accordingly.

The embodiments of the present disclosure are not limited to the embodiments shown in the drawings, but further include modifications of configurations formed based on a manufacturing process. Thus, the regions illustrated in the figures have schematic properties, and the shapes of the regions shown in the figures illustrate specific shapes of regions of elements, but are not intended to be limitative.

In a first aspect, referring to FIGS. 2 to 5, an embodiment of the present disclosure provides an antenna, including: a feed unit layer 1, a phase shifter layer 3, an amplifying circuit layer 2 disposed between the feed unit layer 1 and the phase shifter layer 3, and a temperature control unit layer 4 disposed on a side of the amplifying circuit layer 2. The temperature control unit layer 4 may be disposed on a side of the amplifying circuit layer 2 proximal to the feed unit layer 1, or may be disposed on a side of the amplifying circuit layer 2 proximal to the phase shifter layer 3, which is not limited herein.

Specifically, the amplifying circuit layer 2 is configured to amplify a microwave signal fed from the feed unit layer 1 and transmit the microwave signal to the phase shifter layer 3. The phase shifter layer 3 is configured to shift a phase of the microwave signal by a preset phase shift amount.

The temperature control unit layer 4 is configured to adjust a temperature of the amplifying circuit layer 2 to adjust an operating temperature of the antenna. The antenna provided in the embodiment of the present disclosure may be used as a receiving antenna, in this case, a microwave signal is received by the feed unit layer 1 and then transmitted to the amplifying circuit layer 2 for amplification, and the amplified microwave signal is input into a phase shifter for phase shifting before entering a subsequent circuit.

Referring to FIG. 1, a variation curve of transmission efficiency of the same antenna at different temperatures is shown, where curve 51 represents the case under an operating temperature of the antenna of 25° C., curve S2 represents the case under an operating temperature of the antenna of 50° C., and curve S3 represents the case under an operating temperature of the antenna of 75° C. As can be seen from the figure, as the operating temperature of the antenna increases, the antenna may become unstable due to temperature drifts and thus performance deterioration may occur. In contrast, in the antenna provided in the embodiment of the present disclosure, since the temperature control unit layer 4 that can adjust a temperature of the amplifying circuit layer 2 is provided on a side of the amplifying circuit layer 2, the operating temperature of the antenna is stabilized within a certain range, and thus temperature drifts of the antenna are suppressed and performance degradation of the antenna is prevented.

Figure 4:
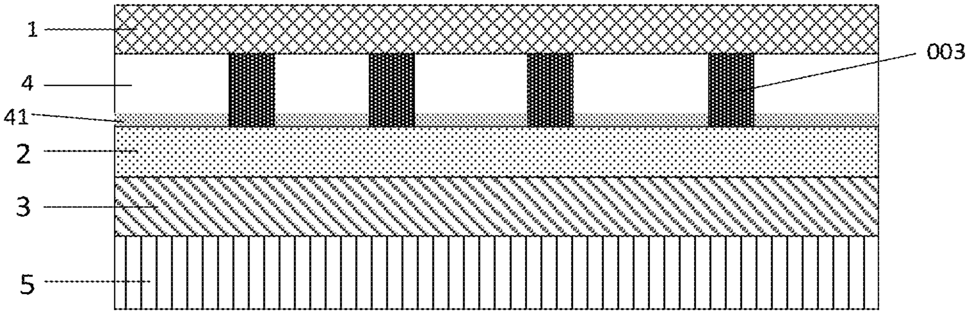
FIG. 4 is a schematic block diagram of an embodiment of an antenna according to an embodiment of the present disclosure.
Figure 5:
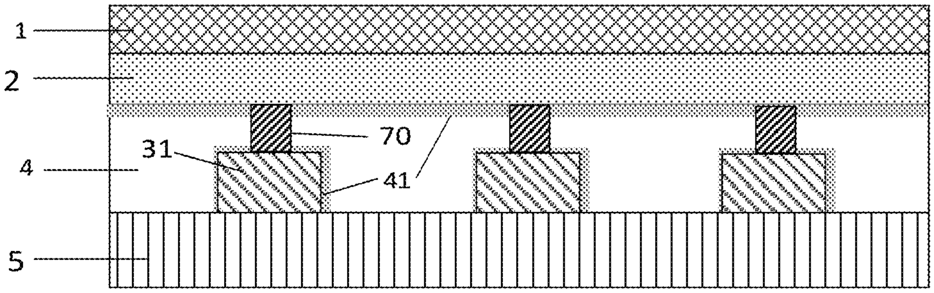
FIG. 5 is a schematic block diagram of another embodiment of an antenna according to an embodiment of the present disclosure.

In some examples, referring to FIGS. 4 and 5, during normal operation of the antenna, since the amplifying circuit layer 2 includes a plurality of amplifying circuits having a plurality of devices, the heat generated by operation of the antenna itself mainly comes from the amplifying circuit layer 2. In the antenna provided by the embodiment of the present disclosure, the temperature control unit layer 4 may be in direct contact with the amplifying circuit layer 2 to better adjust the operating temperature of the amplifying circuit layer 2.

In some examples, referring to FIGS. 4 and 5, the temperature control unit layer 4 may adopt a plurality of temperature regulation modes. For example, a plurality of flow channels may be provided in the temperature control unit layer 4 to accommodate a flow of a working medium. When the operating temperature of the antenna is too high or too low, the working medium at a certain temperature may be driven to flow into the flow channels in the temperature control unit layer 4. Since the temperature control unit layer 4 is disposed proximal to the amplifying circuit layer 2, the temperature of the amplifying circuit layer 2 may be adjusted through the working medium. Specifically, the temperature control unit layer 4 may be a unitary layer structure made of a heat conductive material, such as a metal, and if a base material of the temperature control unit layer 4 is a material with a relatively high strength, it may provide support for the antenna. A shape of the temperature control unit layer 4 is tightly attached to a surface of the amplifying circuit layer 2 in direct contact with the temperature control unit layer 4, and since most heat is absorbed at the position of the contact surface, the position of the contact surface may be referred to as a cold head (or cold finger) 41 of the temperature control unit layer 4, and the plurality of flow channels are further provided in the unitary layer structure.

It should be noted that the working medium is a medium for realizing the mutual conversion between heat energy and mechanical energy, and a certain amount of mechanical energy for driving the working medium to flow is consumed to implement heat exchange, thereby achieving a temperature regulation effect. Specifically, the working medium may be water, ammonia, saturated hydrocarbon, or the like.

In some examples, the feed unit layer 1 may specifically include a first substrate, a plurality of microwave receiving units disposed on the first substrate, and a transmission line power splitting structure disposed on the first substrate. The transmission line power splitting structure has a plurality of first ports and a plurality of second ports. One of the first ports of the transmission line power splitting structure is correspondingly connected to one of the microwave receiving units, and more than one first ports of the transmission line power splitting structure correspond to one of the second ports of the transmission line power splitting structure. That is, each of the first ports serves as an input of the transmission line power splitting structure, and each of the second ports serves as an output of the transmission line power splitting structure. The transmission line power splitting structure is disposed in the same layer and made of the same material as the microwave receiving units. The amplifying circuit layer 2 includes a plurality of amplifying circuits, and one of the amplifying circuits is correspondingly connected to one of the second ports of the transmission line power splitting structure. If the antenna is used as a receiving antenna, after received by any microwave receiving unit, the microwave signal is transmitted, via a second port connected to the microwave receiving unit, to a amplifying circuit connected to the second port for amplification, and then to a phase shifter in the phase shifter layer 3 via the amplifying circuit. The temperature control unit layer 4 may be disposed between the amplifying circuit layer 2 and the first substrate to regulate the temperature of the amplifying circuit layer 2.

Figure 6:
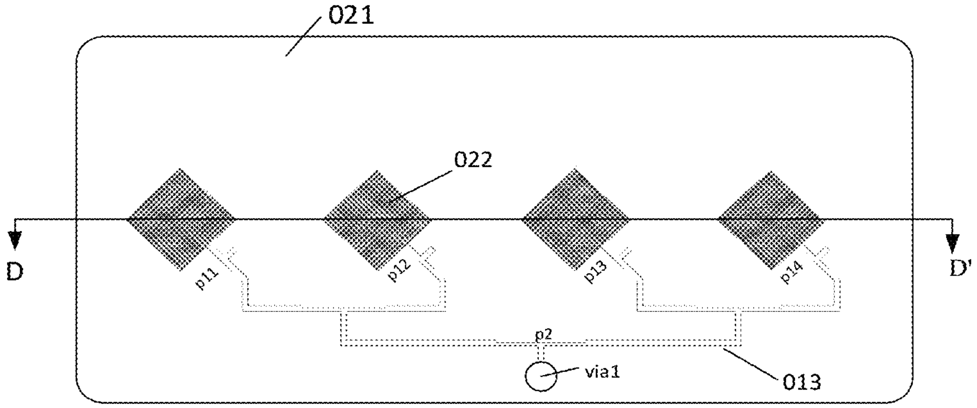
FIG. 6 is a first schematic structural diagram of an embodiment of a feed unit layer of an antenna provided in an embodiment of the present disclosure.
Figure 7:
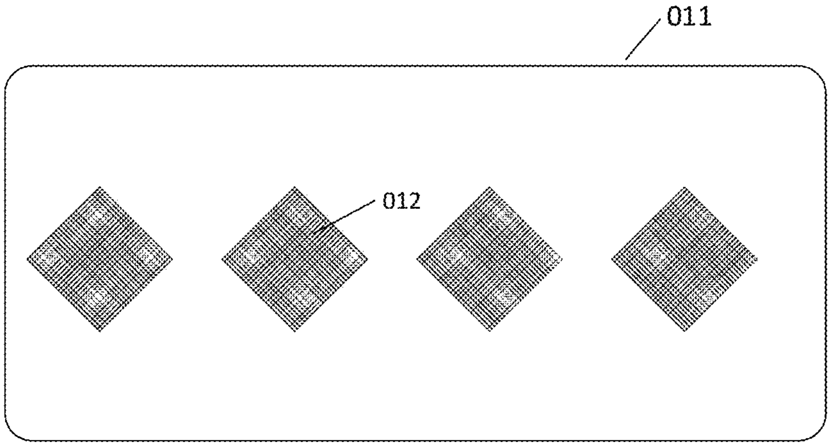
FIG. 7 is a second schematic structural diagram of an embodiment of a feed unit layer of an antenna provided in an embodiment of the present disclosure.
Figure 8:
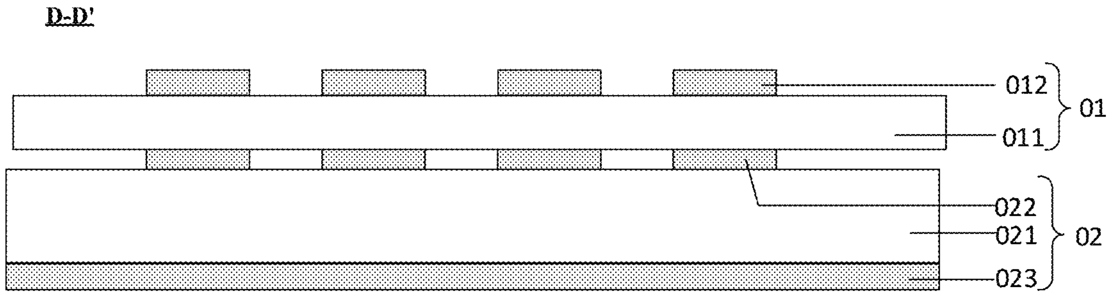
FIG. 8 is a third schematic structural diagram of an embodiment of a feed unit layer of an antenna provided in an embodiment of the present disclosure.

In some examples, referring to FIGS. 6 to 8, the antenna provided in the embodiment of the present disclosure may adopt a dual-layer feed structure in which the feed unit layer 1 includes a first layer feed unit 01 and a second layer feed unit 02. Specifically, the first substrate may include a first sub-substrate 011 and a second sub-substrate 021, and the second sub-substrate 021 is disposed on a side of the first sub-substrate 011 proximal to the amplifying circuit layer 2. The microwave receiving units include first sub-microwave receiving units 012 and second sub-microwave receiving units 022. Referring to FIG. 7, the first sub-microwave receiving units 012 are arranged in an array on a side of the first sub-substrate 011 distal to (i.e., away from) the second sub-substrate 021, and referring to FIG. 6, the second sub-microwave receiving units 022 are arranged in an array on a side of the second sub-substrate 021 proximal to the first sub-substrate 011. The transmission line power splitting structure 013 is disposed on a side of the second sub-substrate 021 proximal to the first sub-substrate 011, and has a plurality of first ports (e.g., first ports p11 to p14) and a plurality of second ports (e.g., second ports p2), and one of the first ports is correspondingly connected to one of the second sub-microwave receiving units 022. The first sub-microwave receiving units 012 and the second sub-microwave receiving units 022 transmit microwave signals in a space coupling manner. Specifically, the first sub-microwave receiving units 012 and the second sub-microwave receiving units 022 are arranged in a one-to-one correspondence mode. That is, as shown in FIG. 8, an orthogonal projection of each first sub-microwave receiving unit 012 on the second sub-substrate 021 at least partially overlaps with an orthogonal projection of the second sub-microwave receiving unit 022 corresponding to the first sub-microwave receiving unit 012 on the second sub-substrate 021. In some embodiments, the orthogonal projection of each first sub-microwave receiving unit 012 on the second sub-substrate 021 may be completely aligned with and may overlap with the orthogonal projection of the second sub-microwave receiving unit 022 corresponding to the first sub-microwave receiving unit 012 on the second sub-substrate 021.

It should be noted that the feed unit layer 1 of the antenna in the embodiment of the present disclosure may include multiple sets of microwave receiving units, and in the figures, each set including four microwave receiving units is taken as an example for illustration. In this embodiment, each of the microwave receiving units may include various types of radiation structures, such as a horn antenna, a patch electrode, etc., and the following will take each of the microwave receiving units being a patch electrode as an example.

In some examples, a second reference electrode 023 is further provided on a side of the second sub-substrate 021 distal to the second sub-microwave receiving units 022, and an orthogonal projection of the second reference electrode 023 on the second sub-substrate 021 at least covers orthogonal projections of the plurality of second sub-microwave receiving units 022 on the second sub-substrate 021.

In some examples, the first sub-substrate 011 and the second sub-substrate 021 may each be a printed circuit board.

In some examples, referring to FIG. 4, The antenna provided in the embodiment of the present disclosure further includes a plurality of microwave connectors 003, each of which has a first end connected to one of the second ports of the transmission line power splitting structure of the feed unit layer 1, and a second end connected to one of the amplifying circuits of the amplifying circuit layer 2. The temperature control unit layer 4 is provided with a plurality of holes along a thickness direction of the temperature control unit layer 4 itself, and each microwave connector 003 penetrates through one hole to connect the amplifying circuit and the second port. Specifically, each microwave connector 003 has a first connection port on the first end, and a second connection port on the second end.

Specifically, each microwave connector 003 has a first connector on the first end, and a second connector on the second end. The first substrate (or the second sub-substrate 021) has therein a plurality of first vias Vial each of which is disposed at the second port, and a plurality of third connectors are disposed at positions of the first vias Vial on a side proximal to the amplifying circuit layer 2. The third connectors are matched with the first connectors, respectively, and the first connector and the third connector at the first ends of each of the microwave connectors 003 are fixed in a plug-in connecting manner, and the first connectors of the microwave connectors 003 each have a reference potential electrode and a core electrode. The reference potential electrode is connected to the second reference electrode 023 on the second sub-substrate 021, and the core electrode passes through the first via Vial to be connected to the second port of the transmission line power splitting structure on the other side of the second sub-substrate 021. A plurality of fourth connectors are further provided on a side of the amplifying circuit layer 2 proximal to the feed unit layer 1. The fourth connectors are matched with the second connectors, respectively, and the second ends of the microwave connectors 003 are respectively fixed by the fourth connectors being respectively plug-in connected with the second connectors.

It will be appreciated that the microwave connectors 003 pass through the holes of the temperature control unit layer 4 to be connected to the feed unit layer 1 and the amplifying circuit layer 2, and the temperature control unit layer 4 has a plurality of flow channels. Therefore, orthogonal projections of the plurality of flow channels on the amplifying circuit layer 2 do not overlap with orthogonal projections of the plurality of holes of the temperature control unit layer 4 on the amplifying circuit layer. That is, provision of the flow channels will not affect the microwave connectors 003.

In some examples, the amplifying circuit layer includes a base substrate, and a plurality of amplifying circuits disposed on the base substrate. Each of the amplifying circuits includes a filter, a noise amplifier new product, and an attenuator, as well as a fourth connector, and the like, provided on a side of the base substrate proximal to the feed unit layer 1. The base substrate has therein a plurality of second vias, and a plurality of second transmission lines are provided on a side of the base substrate distal to the feed unit layer 1, each of the plurality of second transmission lines being connected to an output of an amplifying circuit on the opposite side of the base substrate through a second via. The phase shifter layer 3 includes a plurality of phase shifters 31, and each of the phase shifters 31 is correspondingly connected to one of the amplifying circuits. Specifically, the phase shifters 31 are connected to the amplifying circuits through the second transmission lines, respectively. The phase shifters 31 may receive microwave signals in a waveguide coupling manner, in this case, the second transmission line on the side of the base substrate of the amplifying circuit layer proximal to the phase shifter layer 3 may be connected to a female connector of a coaxial-to-waveguide structure, and then matched and connected to a male connector of the coaxial-to-waveguide structure. One end of the male connector is provided with a probe that can be inserted into the waveguide structure of the phase shifter, so that the amplified microwave signal is fed into the phase shifter.

Referring to FIG. 5, if the temperature control unit layer 4 is disposed on a side of the amplifying circuit layer 2 proximal to the phase shifter layer 3, the temperature control unit layer 4 has a plurality of accommodation cavities that each wrap a phase shifter 31 of the phase shifter layer 3 therein, that is, the unitary layer structure of the temperature control unit layer 4 is provided to fit surface shapes of the phase shifters 31 and the amplifying circuit layer 2, so that the temperature control unit layer 4 is adjacent to the amplifying circuit layer 2 and the phase shifters 31. As such, upon a too high or too low operating temperature of the amplifying circuit layer 2 or the phase shifters 31, the working medium in the plurality of flow channels provided in the temperature control unit layer 4 may be driven to regulate the temperature of the amplifying circuit layer 2 and the phase shifters 31. In order to prevent the flow channels from affecting the phase shifters, it will be appreciated that orthogonal projections of the plurality of flow channels on the amplifying circuit layer 2 do not overlap with orthogonal projections of the plurality of accommodation cavities on the amplifying circuit layer 2.

In some examples, each phase shifter includes a second substrate and a third substrate disposed opposite to each other, and a first dielectric layer disposed between the second substrate and the third substrate. Here, each phase shifter receives a path of signals from a set of microwave receiving units in the feed unit layer after being combined through the transmission line power splitting structure. The phase shifter layer 3 includes a plurality of phase shifters 31, each of which may be independently packaged so that a single phase shifter 31 can be conveniently replaced or selected. Alternatively, the plurality of phase shifters 31 may be arranged on one substrate in an array, that is, the first dielectric layers of the plurality of phase shifters 31 have a one-piece structure, which is not limited herein.

Specifically, the phase shifters 31 in the phase shifter layer 3 may include various types of structures, and the structure of one of the phase shifters 31 is described here as an example. Depending on a dielectric used in the first dielectric layer, the phase shifter 31 may be any one of several types. The following description will be made by taking the first dielectric layer being a liquid crystal, and the phase shifter being a liquid crystal phase shifter as an example.

Figure 9:
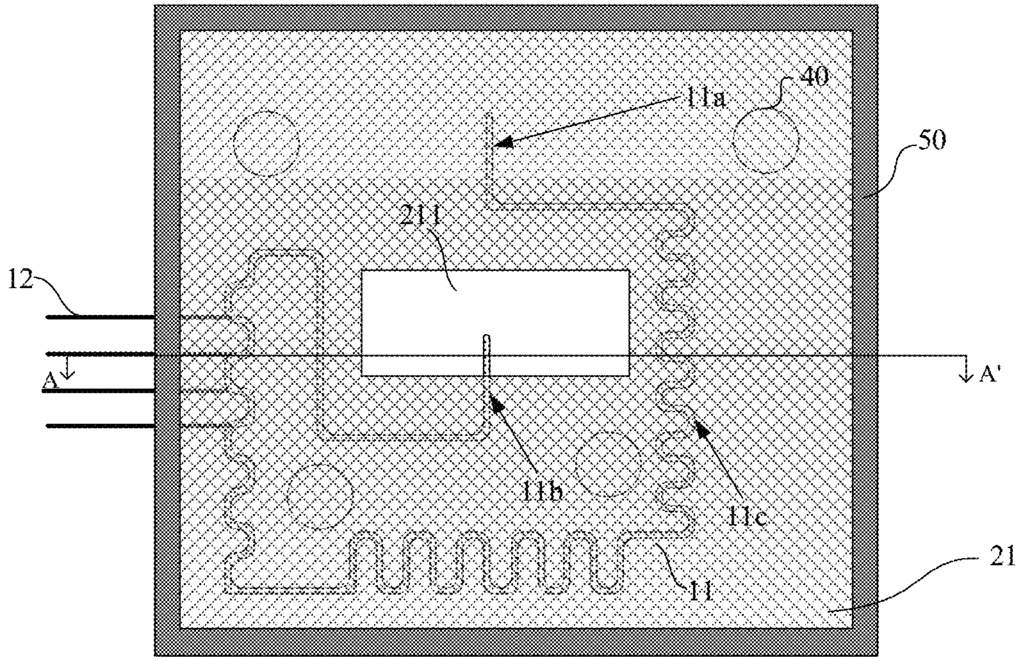
FIG. 9 is a first schematic structural diagram of an embodiment of a phase shifter of an antenna according to an embodiment of the present disclosure.
Figure 10:
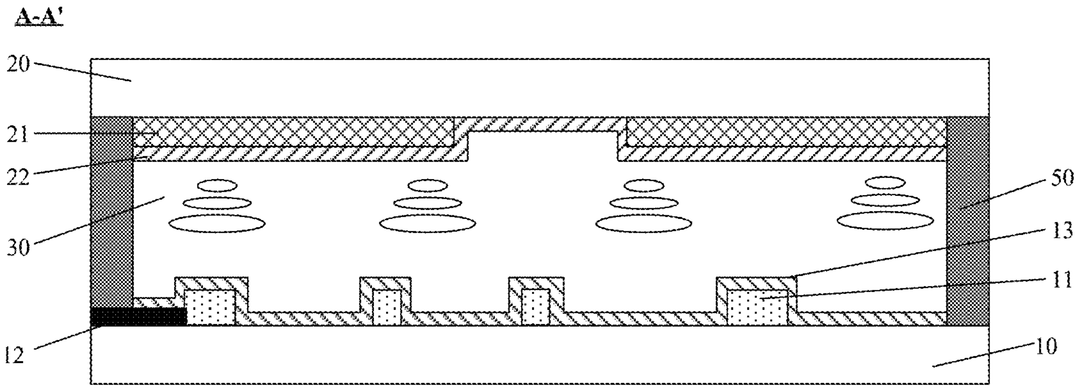
FIG. 10 is a second schematic structural diagram of an embodiment of a phase shifter of an antenna according to an embodiment of the present disclosure.

Referring to FIGS. 9 and 10, FIG. 9 is a schematic structural diagram of a phase shifter of an antenna according to an embodiment of the present disclosure; and FIG. 10 is a sectional view of the phase shifter shown in FIG. 9 taken alone line A-A'. As shown in FIGS. 9 and 10, the liquid crystal phase shifter includes a second substrate and a third substrate disposed opposite to each other, and a liquid crystal layer 30 disposed between the second substrate and the third substrate. The second substrate includes a first base 10, a first transmission line 11 and a bias line 12 disposed on a side of the first base 10 proximal to the liquid crystal layer 30, and a first alignment layer 13 disposed on a side of the first transmission line 11 and the bias line 12 distal to the first base 10. The third substrate includes a second base 20, a first reference electrode 21 disposed on a side of the second base 20 proximal to the liquid crystal layer 30, and a second alignment layer 22 disposed on a side of the first reference electrode 21 proximal to the liquid crystal layer 30. Apparently, as shown in FIGS. 9 and 10, in addition to the above structures, the phase shifter further includes a support structure 40 configured to maintain a cell thickness between the second substrate and the third substrate of the liquid crystal cell), and a sealant 50 for sealing the liquid crystal cell, or other structures, which are not enumerated here.

As shown in FIG. 9, the first transmission line 11 has a first transmission end 11*a*, a second transmission end 11*b*, and a transmission body part. The first transmission end 11*a*, the second transmission end 11*b* and the transmission body part 11*c* each have a first endpoint and a second endpoint. The first endpoint of the first transmission end 11*a* is electrically connected to the first endpoint of the transmission body part 11*c*, and the first endpoint of the second transmission end 11*b* is electrically connected to the second endpoint of the transmission body part 11*c*. It should be noted that the first endpoint and the second endpoint are relative concepts, if the first endpoint is a head end, then the second endpoint is a tail end, and vice versa. In addition, in an embodiment of the present disclosure, when the first endpoint of the first transmission end 11*a* is electrically connected to the first endpoint of the transmission body part 11*c*, the first endpoint of the first transmission end 11*a* and the first endpoint of the transmission body part 11*c* may share a common endpoint. Similarly, the first endpoint of the second transmission end 11*b* is electrically connected to the second endpoint of the transmission body part 11*c*, and the first endpoint of the second transmission end 11*b* and the second endpoint of the transmission body part 11*c* share a common endpoint.

The transmission body part 11*c* includes, but is not limited to, a meandering line (i.e., serpentine line), and may include one or more meandering lines. A shape of the meandering line includes, but is not limited to, a bow shape, a wave shape, or the like.

In some examples, when the transmission body part 11*c* includes a plurality of meandering lines, at least some of the meandering lines have different shapes. That is, some of the plurality of meandering lines may have the same shape, or all of the meandering lines may have different shapes, respectively.

In some examples, when the transmission body part 11*c* of the first transmission line 11 includes at least one meandering line, an orthogonal projection of a first opening 211 of the first reference electrode 21 on the first base 10 does not overlap with a projection of the at least one meandering line on the first base 10. For example: the orthogonal projection of the first opening 211 of the reference electrode 21 on the first base 10 does not overlap with the projection of each of the at least one meandering line on the first base 10. As such, loss in the microwave signal is avoided.

In some examples, when the first transmission end 11*a* serves as a receiving end for the microwave signals, the second transmission end 11*b* serves as a transmitting end for the microwave signals. Similarly, when the second transmission end 11*b* serves as a receiving end for the microwave signals, the first transmission end 11*a* serves as a transmitting end for the microwave signals. The bias line 12 is electrically connected to the first transmission line 11 and configured to apply a direct current (DC) bias signal to the first transmission line 11 so that a DC steady-state electric field is formed between the first transmission line 11 and the first reference electrode 21. Under a force of the electric field, orientations of axes of the liquid crystal molecules in the liquid crystal layer 30 are rotated at the microscopic level. At the macroscopic level, a dielectric constant of the liquid crystal layer 30 is changed. When a microwave signal is transmitted between the first transmission line 11 and the first reference electrode 21, the change in the dielectric constant of the liquid crystal layer 30 causes a phase of the microwave signal to be changed accordingly. Specifically, the phase variation of the microwave signal is positively correlated with rotation angles of the liquid crystal molecules and the electric field strength, that is, the phase of the microwave signal can be changed by applying a DC bias voltage, which is the working principle of the liquid crystal phase shifter.

Figure 11:
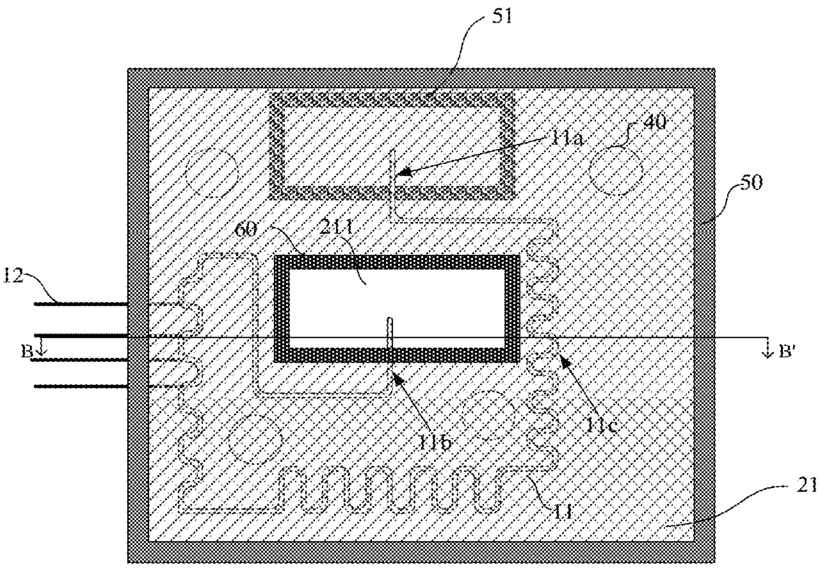
FIG. 11 is a third schematic structural diagram of an embodiment of a phase shifter of an antenna according to an embodiment of the present disclosure.
Figure 12:
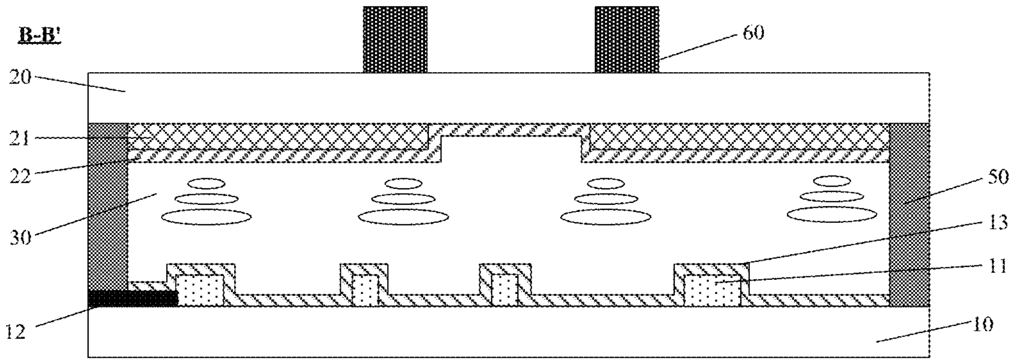
FIG. 12 is a fourth schematic structural diagram of an embodiment of a phase shifter of an antenna according to an embodiment of the present disclosure.

Referring to FIGS. 11 and 12, the phase shifter of the antenna according to the embodiment of the present disclosure may further include a first waveguide structure 60 located on a side of the third substrate distal to the liquid crystal layer 30. The second substrate and the third substrate in this embodiment of the present disclosure may have the same structures as the second substrate and the third substrate of the liquid crystal phase shifter shown in FIGS. 9 and 10. Namely, the second substrate includes a first base 10, and a first transmission line 11, a bias line 12 and a first alignment layer 13 that are disposed on the first base 10, and the third substrate includes a second base 20, and a first reference electrode 21 and a second alignment layer that are disposed on the second base 20. The first waveguide structure 60 is configured to transmit microwave signals in a coupling manner with the first transmission end 11*a* (i.e., the first end) of the first transmission line 11.

Correspondingly, as described above, if the phase shifter uses the first waveguide structure 60 to receive the microwave signal, the second transmission line on the side of the base substrate of the amplifying circuit layer 2 proximal to the phase shifter layer 3 may be connected to a female connector of a coaxial-to-waveguide structure, and then matched and connected to a male connector of the coaxial-to-waveguide structure. One end of the male connector is provided with a probe that can be inserted into the first waveguide structure 60 of the phase shifter, so that the amplified microwave signal is fed into the phase shifter.

It should be noted that, in the embodiments of the present disclosure, the phase shifter further includes a first wiring board and a second wiring board. The first wiring board is bonded to the first substrate and configured to supply a DC bias voltage to the bias line 12. The second wiring board is bonded to the second substrate and configured to provide a ground signal to the first reference electrode 21. Each of the first wiring board and the second wiring board may include various types of wiring boards, such as a flexible printed circuit (FPC) or a printed circuit board (PCB), or the like, which is not limited herein. The first wiring board may have at least one first pad, one end of the bias line 12 is connected to (i.e., bonded to) the first pad, and the other end of the bias line 12 may be connected to the first transmission line 11. The second wiring board may also have at least one second pad, and the second wiring board is electrically connected to the first reference electrode 21 through a second connection pad.

In some examples, in addition to the above structures, the phase shifter further includes a support structure 40, a sealant 50, or other structures. The sealant 50 is disposed between the second substrate and the third substrate, located in a peripheral area and surrounding a microwave transmission area, and is configured to seal a liquid crystal cell of the phase shifter. The support structure 40 is disposed between the second substrate and the third substrate, and more than one support structures 40 may be provided at intervals in the microwave transmission area to maintain the cell thickness of the liquid crystal cell.

In some examples, the bias line 12 is made of a high resistance material, and upon a DC bias applied on the bias line 12, the electric field formed by the bias line 12 and the first reference electrode 21 is merely configured to drive the liquid crystal molecules of the liquid crystal layer 30 to rotate, which is equivalent to an open circuit for the microwave signal transmitted by the phase shifter, that is, the microwave signal is transmitted along the first transmission line 11 solely. In some examples, the material of the bias line 12 includes, but is not limited to, any one of indium tin oxide (ITO), nickel (Ni), tantalum nitride (TaN), chromium (Cr), indium oxide (In2O3), and tin oxide (Sn2O3). Preferably, the bias line 12 is made of ITO.

In some examples, the first transmission line 11 is made of a metal material. Specifically, the material of the first transmission line 11 includes, but is not limited to, aluminum, silver, gold, chromium, molybdenum, nickel, iron or other metals.

In some examples, the first transmission line 11 is a delay line having a corner not equal to 90°, so as to avoid loss in the microwave signal due to reflection of the microwave signal occurring at the corner of the delay line.

In some examples, the first base 10 may be made of various materials. For example, if the first base 10 is a flexible base, the material of the first base 10 may include at least one of polyethylene glycol terephthalate (PET) or polyimide (PI), and if the first base 10 is a rigid base, the material of the first base 10 may be glass, or the like. The first base 10 may have a thickness around 0.1 mm to 1.5 mm. The second base 20 may be also made of various materials. For example, if the second base 20 is a flexible base, the material of the second base 20 may include at least one of polyethylene glycol terephthalate (PET) or polyimide (PI), and if the second base 20 is a rigid base, the material of the second base 20 may be glass, or the like. The second base 20 may have a thickness around 0.1 mm to 1.5 mm. Alternatively, other materials may be used for each of the first base 10 and the second base 20, which is not limited herein. The specific thicknesses of the first base 10 and the second base 20 may also be set according to a skin depth of the electromagnetic wave (radio frequency signal).

Figure 13:
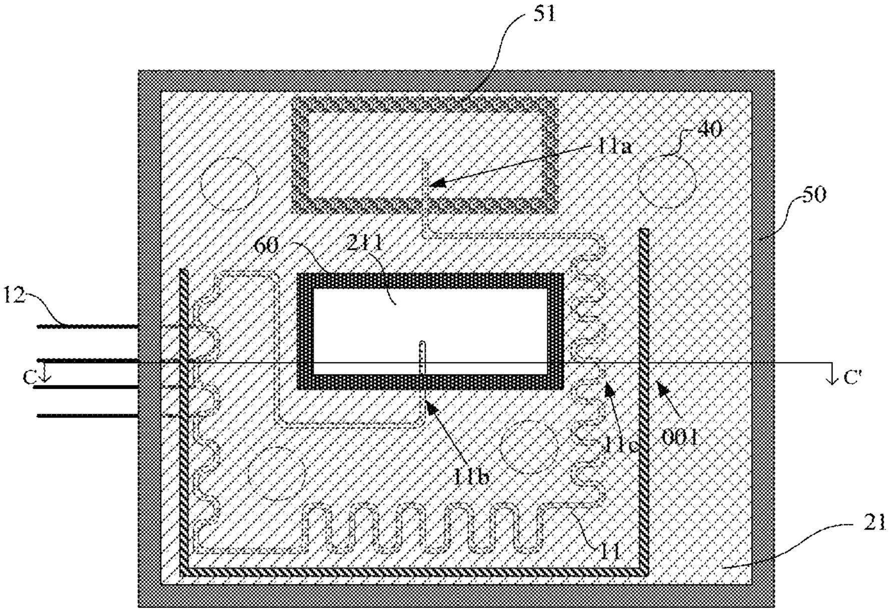
FIG. 13 is a fifth schematic structural diagram of an embodiment of a phase shifter of an antenna according to an embodiment of the present disclosure.
Figure 14:
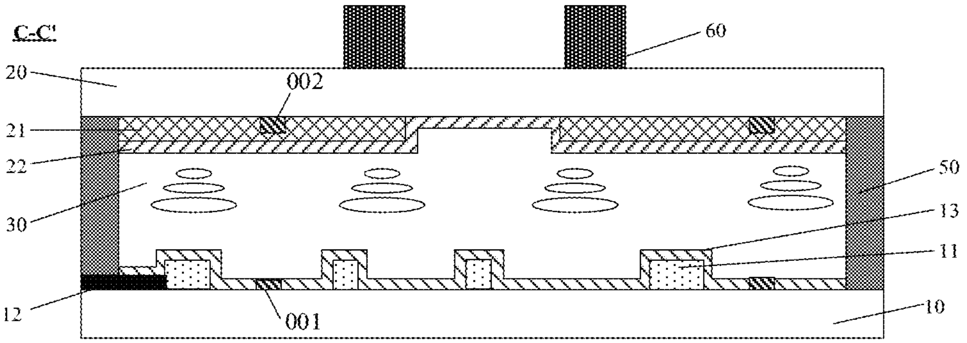
FIG. 14 is a sixth schematic structural diagram of an embodiment of a phase shifter of an antenna according to an embodiment of the present disclosure.
Figure 15:
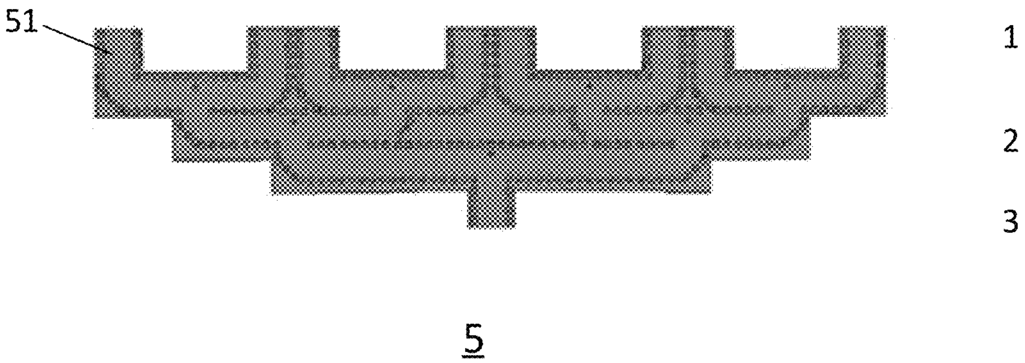
FIG. 15 is a schematic structural diagram of an embodiment of a waveguide power splitting structure of an antenna according to an embodiment of the present disclosure.

In some examples, because the medium (such as liquid crystal) in the phase shifter tends to be affected by temperature, the antenna provided in the embodiments of the present disclosure may further include a temperature regulation structure disposed in the phase shifter for directly adjusting an operating temperature of the phase shifter so that the phase shifter operates at a stable temperature, and thus has a stable performance. The temperature regulation structure may include various types, and referring to FIGS. 13 and 14, the phase shifter may further include a first temperature regulation structure 001 and a second temperature regulation structure 002. The first temperature regulation structure 001 may be disposed on the first base 10, and the second temperature regulation structure 002 may be disposed on the second base 20. Specifically, the second substrate may include a first base 10, a first temperature regulation structure 001 disposed on a side of the first base 10 proximal to the liquid crystal layer 30 and configured to adjust an operating temperature of the phase shifter 31, and a first transmission line 11 disposed on a side of the first temperature regulation structure 001 proximal to the first liquid crystal layer 30. The third substrate may include a second base 20, a second temperature regulation structure 002 disposed on a side of the second base 20 proximal to the liquid crystal layer 30 and configured to adjust an operating temperature of the phase shifter. The third substrate of the phase shifter further includes a first reference electrode 21 disposed on a side of the second temperature regulation structure 002 proximal to the liquid crystal layer 30. An orthogonal projection of the first reference electrode 21 on the first base 10 at least partially overlaps with an orthogonal projection of the first transmission line 11 on the first base 10, and an orthogonal projection of the first opening 211 on the first base 10 at least partially overlaps with an orthogonal projection of a first end (i.e., the first transmission end 11*a*) of the first transmission line 11 on the first base 10.

Further, in order to prevent the heat generated by the first temperature regulation structure 001 and the second temperature regulation structure 002 themselves from affecting the signal on the first transmission line 11, an orthogonal projection of the first temperature regulation structure 001 on the first base 10 and an orthogonal projection of the second temperature regulation structure 002 on the first base 10 do not overlap with the orthogonal projection of the first transmission line 11 on the first base 10. That is, the first temperature regulation structure 001 and the second temperature regulation structure 002 are at a certain distance from the first transmission line 11.

Further, if the phase shifter includes the first waveguide structure 60, an orthogonal projection of the first waveguide structure 60 on the first base 10 does not overlap with the orthogonal projections of the first temperature regulation structure 001 and the second temperature regulation structure 002 on the first base 10 so that the heat generated by the first temperature regulation structure 001 and the second temperature regulation structure 002 themselves is prevented from affecting the transmission performance of the phase shifter.

In some examples, a minimum distance between the first temperature regulation structure 001 and at least one of the first transmission line 11 or the first waveguide structure 60 is greater than or equal to 0.5 mm, and/or, a minimum distance between the second temperature regulation structure 002 and at least one of the first transmission line 11 or the first waveguide structure 60 is greater than or equal to 0.5 mm.

In some examples, the first temperature regulation structure 001 and the second temperature regulation structure 002 may have various types of structures and arranged in various manners. For example, the first temperature regulation structure 001 and/or the second temperature regulation structure 002 are resistance wires that may be arranged around a periphery of the first opening 211 and the first transmission line 11, or may be arranged in a straight line or in a spiral pattern, which is not limited herein. The resistance wire may be made of a high resistance material, such as indium tin oxide, which is not limited herein.

In some examples, the antenna provided in the embodiment of the present disclosure may further include a plurality of temperature detection units (not shown in the figures) which are disposed in at least some of the plurality of phase shifters 31 of the phase shifter layer 3, and may be disposed on a side of the second or third substrate of each of the some phase shifters 31, i.e., on a side of either of the second substrate and the third substrate proximal to or distal to the first dielectric layer. The temperature detection units are configured to detect the operating temperature of the phase shifters, and may be, for example, thermistors, thermocouples, or the like.

In some examples, the antenna provided in the embodiment of the present disclosure may further include a controller connected to the temperature detection units, the first temperature regulation structure 001 and the second temperature regulation structure 002. The controller may control the first temperature regulation structure 001 and the second temperature regulation structure 002 to adjust the temperature of the phase shifters 31 according to the operating temperature of the phase shifters 31 fed back from the temperature detection units.

In some examples, with reference to FIGS. 4, 5 and 13, FIG. 15 takes a waveguide power splitting structure 5 including three levels of sub-waveguide structures 51 as an example, but does not limit the present disclosure. The antenna provided in the embodiment of the present disclosure may further include a waveguide power splitting structure 5 disposed on a side of the phase shifter layer 3 distal to the amplifying circuit layer 2 and connected to the phase shifters in the phase shifter layer 3.

Specifically, the waveguide power splitting structure 5 may have n levels of sub-waveguide structures 51, and in a direction from the phase shifter layer to the waveguide power splitting structure 5, the n levels of sub-waveguide structures 51 are referred to as the first level sub-waveguide structures to the $n^{th}$ level sub-waveguide structures, respectively, and the number of the sub-waveguide structures in each level is gradually reduced from the first level to the $n^{th}$ level; where n is an integer and $n \geq 2$.

When n=2, a first end of each first level sub-waveguide structure is connected to one of the phase shifters, and second ends of at least two first level sub-waveguide structures are connected to a first end of a second level sub-waveguide structure; a second end of each second level sub-waveguide structure is used as a combiner end of the waveguide power splitting structure 5.

When n>2, a first end of each first level sub-waveguide structure is connected to one of the phase shifters, and second ends of at least two first level sub-waveguide structures are connected to a first end of a second level sub-waveguide structure; a first end of each $m^{th}$ level sub-waveguide structure is connected to second ends of at least two $(m-1)^{th}$ level sub-waveguide structures, and second ends of at least two $m^{th}$ level sub-waveguide structures are connected to a first end of a $(m+1)^{th}$ level sub-waveguide structure, where m is an integer and $1<m<N$; and a first end of each $n^{th}$ level sub-waveguide structure is connected to second ends of at least two $(n-1)^{th}$ level sub-waveguide structures, and a second end of each $n^{th}$ level sub-waveguide structure is used as a combiner end of the waveguide power splitting structure 5.

That is to say, the waveguide power splitting structure 5 includes multiple levels of power splitting sub-waveguide structures, multiple paths of microwave signals are combined from the first level sub-waveguide structures to the $n^{th}$ sub-waveguide structures level by level until the last level, and then combined as a final output of the waveguide power splitting structure. In some examples, a second end of a last level sub-waveguide structure is connected to a signal connector, such as an SMA connector, and a port test connector may be connected to each sub-waveguide structure externally for testing.

In some examples, n=4, that is, the waveguide power splitting structure 5 may have four levels of sub-waveguide structures 51, and every 4 waveguide structures are combined into one path for signals, namely, a four-in-one power splitter is used as the waveguide power splitting structure, and a sixteen-in-one power splitter may be used as the transmission line power splitting structure in the feed unit layer 1. On this basis, in some examples, the feed unit layer 1 has 1024 microwave receiving units, and after passing through the sixteen-in-one transmission line power splitting structure, the received signals are combined into 64 paths of microwave signals, which then pass through 64 microwave connectors 70 into 64 amplifying circuits of the amplifying circuit layer 2, respectively, and then enter each level of waveguide power splitting structures 51 each being a four-in-one sub-waveguide structure, and finally pass through the four levels of sub-waveguide structures to complete the signal combination process of 64 paths-16 paths-4 paths-1 path, and to be input into a subsequent circuit as a final one path of microwave signals.

Furthermore, the connection manner of the first level sub-waveguide structures and the phase shifter may specifically include: coupling each of the first level sub-waveguide structures to the second transmission end 11*b*, as the output end, of the first transmission line 11 of the phase shifter, which means that each first level sub-waveguide structure is located on a side of the second substrate of a phase shifter distal to the liquid crystal layer 30. Each first level sub-waveguide structure is configured to transmit microwave signals by coupling to the second transmission end 11*b* (i.e., the second end) of the first transmission line 11 through the first opening 211 in the first reference electrode 21. That is, an orthogonal projection of each first level sub-waveguide structure on the second substrate at least partially overlaps with an orthogonal projection of the first opening 211 in the first reference electrode 21 of the phase shifter corresponding to the sub-waveguide structure on the second substrate.

In a second aspect, the present application further provides a temperature control system of an antenna, the temperature control system including the antenna as described above.

In some examples, the temperature control system of an antenna may further include a circulation device connected to each flow channel of the temperature control unit layer and configured to drive circulation of the working medium.

In some examples, the circulation device may include a working medium driving unit and a working medium temperature controller. The working medium driving unit is configured to drive the working medium to flow, and may be, for example, a water-cooling pump, a motor, or the like, and the working medium temperature controller is configured to control a temperature of the working medium, and has heating, refrigerating, and temperature control functions, and is capable of controlling the temperature of the working medium to be constant, for example, to be constant between 25° C.±0.5° C.

It will be appreciated that the above implementations are merely exemplary implementations for the purpose of illustrating the principle of the present disclosure, and the present disclosure is not limited thereto. It will be apparent to those skilled in the art that various modifications and variations can be made to the exemplary implementations without departing from the spirit or essence of the present disclosure. Such modifications and variations should also be considered as falling into the protection scope of the present disclosure.

What is claimed is:

1. An antenna, comprising: a feed unit layer, a phase shifter layer, an amplifying circuit layer between the feed unit layer and the phase shifter layer, and a temperature control unit layer on a side of the amplifying circuit layer; wherein the amplifying circuit layer is configured to amplify a microwave signal fed from the feed unit layer and transmit the microwave signal to the phase shifter layer;

the phase shifter layer is configured to shift a phase of the microwave signal by a preset phase shift amount;

the temperature control unit layer is configured to adjust a temperature of the amplifying circuit layer to adjust an operating temperature of the antenna;

wherein the temperature control unit layer is in direct contact with the amplifying circuit layer; and wherein the feed unit layer comprises a first substrate, a plurality of microwave receiving units on the first substrate, and a transmission line power splitting structure on the first substrate;

the transmission line power splitting structure has a plurality of first ports and a plurality of second ports, wherein each of the first ports is correspondingly connected to one of the microwave receiving units, and more than one of the first ports correspond to one of the second ports;

the amplifying circuit layer comprises a plurality of amplifying circuits, and each of the amplifying circuits is correspondingly connected to one of the second ports; and the temperature control unit layer is between the amplifying circuit layer and the first substrate; wherein a plurality of flow channels are provided in the temperature control unit layer to accommodate a flow of a working medium.

2. The antenna according to claim 1, further comprising: a plurality of microwave connectors, each of which has a first end connected to one of the second ports and a second end connected to one of the amplifying circuits;

a plurality of holes are provided in the temperature control unit layer along a thickness direction of the temperature control unit layer, via which the microwave connectors respectively penetrate through the temperature control unit layer; and orthogonal projections of the plurality of flow channels on the amplifying circuit layer do not overlap with orthogonal projections of the plurality of holes on the amplifying circuit layer.

3. The antenna according to claim 1, wherein the phase shifter layer comprises a plurality of phase shifters; each phase shifter comprises a second substrate and a third substrate opposite to each other, and a first dielectric layer between the second substrate and the third substrate;

the second substrate comprises: a first base; a first temperature regulation structure on a side of the first base proximal to the first dielectric layer, and configured to adjust an operating temperature of the phase shifter; and a first transmission line on a side of the first temperature regulation structure proximal to the first dielectric layer; and the third substrate comprises: a second base; a second temperature regulation structure on a side of the second base proximal to the first dielectric layer, and configured to adjust the operating temperature of the phase shifter; and a first reference electrode having a first opening and on a side of the second temperature regulation structure proximal to the first dielectric layer; an orthogonal projection of the first reference electrode on the first base at least partially overlaps with an orthogonal projection of the first transmission line on the first base, and an orthogonal projection of the first opening on the first base at least partially overlaps with an orthogonal projection of a first end of the first transmission line on the first base, and wherein an orthogonal projection of the first temperature regulation structure on the first base and an orthogonal projection of the second temperature regulation structure on the first base do not overlap with the orthogonal projection of the first transmission line on the first base.

4. The antenna according to claim 3, wherein the antenna further comprises: a plurality of temperature detection units on a side of the third or second substrate of each of at least some of the plurality of phase shifters and configured to detect the operating temperature of the phase shifter.

5. The antenna according to claim 3, wherein the amplifying circuit layer comprises a plurality of amplifying circuits, and each of the phase shifters is correspondingly connected to one of the amplifying circuits; each of the phase shifters further comprises: a first waveguide structure connected between the phase shifter and the amplifying circuit; the first waveguide structure is configured to transmit a microwave signal by coupling to the first end of the first transmission line through the first opening; and wherein an orthogonal projection of the first waveguide structure on the first base does not overlap with the orthogonal projections of the first temperature regulation structure and the second temperature regulation structure on the first base.

6. The antenna according to claim 5, wherein a minimum distance between the first temperature regulation structure and at least one of the first transmission line or the first waveguide structure is greater than or equal to 0.5 mm, and/or, a minimum distance between the second temperature regulation structure and at least one of the first transmission line or the first waveguide structure is greater than or equal to 0.5 mm.

7. The antenna according to claim 3, wherein the first and/or second temperature regulation structure are resistance wires.

8. The antenna according to claim 1, wherein the first substrate comprises a first sub-substrate and a second sub-substrate, and the second sub-substrate is on a side of the first sub-substrate proximal to the amplifying circuit layer;

the microwave receiving units comprise first sub-microwave receiving units and second sub-microwave receiving units, the first sub-microwave receiving units are arranged in an array on a side of the first sub-substrate distal to the second sub-substrate, and the second sub-microwave receiving units are arranged in an array on a side of the second sub-substrate proximal to the first sub-substrate; and the transmission line power splitting structure is on a side of the second sub-substrate proximal to the first sub-substrate, and each of the first ports is correspondingly connected to one of the second sub-microwave receiving units; and wherein the first sub-microwave receiving units are in a one-to-one correspondence with the second sub-microwave receiving units, and an orthogonal projection of each first sub-microwave receiving unit on the second sub-substrate at least partially overlaps with an orthogonal projection of a corresponding second sub-microwave receiving unit on the second sub-substrate.

9. The antenna according to claim 8, wherein the second sub-substrate has a plurality of first vias penetrating through the second sub-substrate in a thickness direction of the second sub-substrate, and each of the second ports corresponds to one of the first vias; and the antenna further comprises: a plurality of microwave connectors; wherein each of the microwave connectors has a first end penetrating through one of the first vias to be connected to one of the second ports, and a second end connected to one of the amplifying circuits.

10. The antenna according to claim 1, further comprising: a waveguide power splitting structure on a side of the phase shifter layer distal to the amplifying circuit layer; wherein the waveguide power splitting structure has n levels of sub-waveguide structures, and in a direction from the phase shifter layer to the waveguide power splitting structure, the number of the sub-waveguide structures in each level is gradually reduced from the first level to the $n^{th}$ level; where $n \geq 2$;

a first end of each first level sub-waveguide structure is connected to one of the phase shifters, and second ends of at least two first level sub-waveguide structures are connected to a first end of one second level sub-waveguide structure;

a first end of each $m^{th}$ level sub-waveguide structure is connected to second ends of at least two $(m-1)^{th}$ level sub-waveguide structures, and second ends of at least two $m^{th}$ level sub-waveguide structures are connected to a first end of one $(m+1)^{th}$ level sub-waveguide structure, where $1<m<n$; and a first end of each $n^{th}$ level sub-waveguide structure is connected to second ends of at least two $(n-1)^{th}$ level sub-waveguide structures, and a second end of each $n^{th}$ level sub-waveguide structure serves as a combiner end of the waveguide power splitting structure.

11. A temperature control system of an antenna, wherein the antenna is the antenna according to claim 1.

12. The temperature control system according to claim 11, wherein in the antenna: the temperature control unit layer is in direct contact with the amplifying circuit layer; the feed unit layer comprises a first substrate, a plurality of microwave receiving units on the first substrate, and a transmission line power splitting structure on the first substrate; the transmission line power splitting structure has a plurality of first ports and a plurality of second ports, wherein each of the first ports is correspondingly connected to one of the microwave receiving units, and more than one of the first ports correspond to one of the second ports; the amplifying circuit layer comprises a plurality of amplifying circuits, and each of the amplifying circuits is correspondingly connected to one of the second ports; and the temperature control unit layer is between the amplifying circuit layer and the first substrate; wherein a plurality of flow channels are provided in the temperature control unit layer to accommodate a flow of a working medium, and the temperature control system further comprises: a circulation device connected to the flow channels; wherein the circulation device comprises a working medium driving unit and a working medium temperature controller, the working medium driving unit is configured to drive the working medium to flow, and the working medium temperature controller is configured to control a temperature of the working medium.

13. The temperature control system according to claim 11, wherein in the antenna: the temperature control unit layer is in direct contact with the amplifying circuit layer; the amplifying circuit layer comprises a plurality of amplifying circuits; the phase shifter layer comprises a plurality of phase shifters, and each of the phase shifters is correspondingly connected to one of the amplifying circuits;

the temperature control unit layer is on a side of the amplifying circuit layer proximal to the phase shifter layer, and has a plurality of accommodation cavities that wrap the phase shifters therein, respectively; and the temperature control unit layer is provided with a plurality of flow channels configured to accommodate a flow of a working medium;

wherein orthogonal projections of the plurality of flow channels on the amplifying circuit layer do not overlap with orthogonal projections of the plurality of accommodation cavities on the amplifying circuit layer, and the temperature control system further comprises: a circulation device connected to the flow channels; wherein the circulation device comprises a working medium driving unit and a working medium temperature controller, the working medium driving unit is configured to drive the working medium to flow, and the working medium temperature controller is configured to control a temperature of the working medium.

14. An antenna, comprising: a feed unit layer, a phase shifter layer, an amplifying circuit layer between the feed unit layer and the phase shifter layer, and a temperature control unit layer on a side of the amplifying circuit layer; wherein the amplifying circuit layer is configured to amplify a microwave signal fed from the feed unit layer and transmit the microwave signal to the phase shifter layer;

the phase shifter layer is configured to shift a phase of the microwave signal by a preset phase shift amount;

the temperature control unit layer is configured to adjust a temperature of the amplifying circuit layer to adjust an operating temperature of the antenna;

wherein the temperature control unit layer is in direct contact with the amplifying circuit layer;

wherein the amplifying circuit layer comprises a plurality of amplifying circuits; the phase shifter layer comprises a plurality of phase shifters, and each of the phase shifters is correspondingly connected to one of the amplifying circuits;

the temperature control unit layer is on a side of the amplifying circuit layer proximal to the phase shifter layer, and has a plurality of accommodation cavities that wrap the phase shifters therein, respectively; and the temperature control unit layer is provided with a plurality of flow channels configured to accommodate a flow of a working medium;

wherein orthogonal projections of the plurality of flow channels on the amplifying circuit layer do not overlap with orthogonal projections of the plurality of accommodation cavities on the amplifying circuit layer.

15. The antenna according to claim 14, wherein each phase shifter comprises a second substrate and a third substrate opposite to each other, and a first dielectric layer between the second substrate and the third substrate; and first dielectric layers of the plurality of phase shifters have a one-piece structure.

16. The antenna according to claim 14, wherein the phase shifter layer comprises a plurality of phase shifters; each phase shifter comprises a second substrate and a third substrate opposite to each other, and a first dielectric layer between the second substrate and the third substrate;

the second substrate comprises: a first base; a first temperature regulation structure on a side of the first base proximal to the first dielectric layer, and configured to adjust an operating temperature of the phase shifter; and a first transmission line on a side of the first temperature regulation structure proximal to the first dielectric layer; and the third substrate comprises: a second base; a second temperature regulation structure on a side of the second base proximal to the first dielectric layer, and configured to adjust the operating temperature of the phase shifter; and a first reference electrode having a first opening and on a side of the second temperature regulation structure proximal to the first dielectric layer; an orthogonal projection of the first reference electrode on the first base at least partially overlaps with an orthogonal projection of the first transmission line on the first base, and an orthogonal projection of the first opening on the first base at least partially overlaps with an orthogonal projection of a first end of the first transmission line on the first base, and wherein an orthogonal projection of the first temperature regulation structure on the first base and an orthogonal projection of the second temperature regulation structure on the first base do not overlap with the orthogonal projection of the first transmission line on the first base.

17. A temperature control system of an antenna, wherein the antenna is the antenna according to claim 14.

* * * * *